Patented Apr. 20, 1926.

1,581,115

UNITED STATES PATENT OFFICE.

CHARLES HENRY HASLER HAROLD, OF ALDERSHOT, ENGLAND, ASSIGNOR TO UNITED WATER SOFTENERS LIMITED, OF LONDON, ENGLAND, A BRITISH COMPANY.

PREPARATION OF STERILIZING AGENTS, GERMICIDES, AND THE LIKE.

No Drawing. Application filed October 3, 1925. Serial No. 60,312.

*To all whom it may concern:*

Be it known that I, CHARLES HENRY HASLER HAROLD, a British subject, and resident of the Army School of Hygiene, Puckridge Hill, Aldershot, Hants, England, have invented certain new and useful Improvements in the Preparation of Sterilizing Agents, Germicides, and the like, of which the following is a specification.

This invention relates to the preparation of sterilizing agents, germicides and the like, and to processes of applying such agents, more particularly for the sterilization of water, sewage and so forth, although the invention is not confined to such uses.

In the treatment of water with chlorine for purposes of sterilization and purification, some traces of chloramines have no doubt been produced when organic matter yielding ammonia and ammonium compounds has been present. The use of chloramines, produced by the interaction of bleaching powder and ammonia, for purposes of water purification is known but the yield of chloramines was such that the proccess has not proved satisfactory. It has not been found possible hitherto to produce any useful strength of chloramine by the direct interaction of ammonia and chlorine.

It is the principal object of this invention to effect the production of chloramines from ammonia and chlorine in such a state of relative concentration that the product can be used as a strong solution for dosing into water and the like to be sterilized, and that the plant required for the purpose shall be economical and effective.

The process according to the present invention consists in adding chlorine in a suitable concentrated solution or in the form of gas to a dilute solution of ammonia, with the result that chloramines are produced in substantial quantity. It has been found that if the concentration of the ammonia in solution is 12.5 parts per million of water, i. e. .0125 gramme per litre, and to this the equivalent amount of chlorine is added, that is to say about 50 parts by weight of the chlorine to each 12.5 parts of the ammonia in solution, the chlorine being, either in the form of a concentrated solution or as a gas, the yield of mono-chloramine, $NH_2Cl$, is substantially quantitative. If a stronger solution of ammonia be used, with more chlorine, the reaction ceases to be quantitative, unless special precautions are taken. Without such precautions, when the ammonia solution has reached a concentration of 100 parts per million of water, the yeild is 50 per cent or less of the best theoretical yield. If, however, suitable means are adopted for preventing local rise of temperature resulting from the heat of the rereaction between the chlorine and ammonia, either the mono-chloramine or the di-chloramine may be obtained by the direct interaction of chlorine with ammonia solution in water in considerably higher concentrations. Although at lower concentrations of ammonia than 12.5 parts per million as mentioned above, the production of mono-chloramine is still substantially quantitative I prefer to employ the more concentrated solutions since it is clear that the employment of dilute and consequently large bulks of liquor is disadvantageous and, for example if the concentration be halved, the amount o. liquor to be used and the size of the plant begin to render the process unpractical.

Theoretically, of course, extremely dilute solutions may be used by employing, for example, the entire bulk of the water to be treated as the vehicle for the ammonia, and although under certain conditions this may, no doubt, be done, it is not to be recommended for various reasons. One reason is that in the presence of many of the common impurities of natural waters such, for example, as nitrites or albumenoid ammonia, the formation of the chloramines is largely or even completely inhibited, although when the chloramines have once been prepared in the absence of such impurities, their subsequent sterilizing action is not inhibited by the presence of such impurities.

If half of the proportionate amount of ammonia, for example, 6.25 parts of ammonia per million of water be used with the same quantity of chlorine, say about 50 parts of chlorine to each 6.25 parts of ammonia in the solution, the chlorine being in strong aqueous solution or in the form of gas, the di-chloramine $NHCl_2$ is produced. In the formation of this body substantially the same conditions apply in respect of yield in terms of concentration as already given in detail with regard to the mono-chloramine.

The di-chloramine has been found to be effective as a sterilizing agent, but is generally somewhat slower in action than the mono-chloramine. When quantities of ammonia and chlorine in intermediate ratios to those already specified are employed, mixtures of the mono-chloramine and the di-chloramine are produced and such mixtures are found to be effective for the purpose in view. It is also possible to prepare solutions of the di-chloramine by the further addition of the requisite quantity of concentrated chlorine solution, or of chlorine gas to a previously prepared solution of mono-chloramine.

While the equivalent quantities given above yield generally the best results, in the case of mono-chloramine an excess of ammonia and in the case of di-chloramine an excess of chlorine may be employed without detriment. For example, in preparing mono-chloramine the proportion of ammonia to chlorine may be raised to 1.25 parts of ammonia to 1 part of chlorine and in preparing the di-chloramine the proportion of chlorine may be raised to 15 parts of chlorine to 1 part of ammonia without interfering with the production of the chloramine or chloramines.

As already mentioned, means may be adopted to prevent local rise of temperature due to the heat of the reaction and then a high yield may be obtained by using a greater concentration of ammonia. For example, if gaseous chlorine be allowed to diffuse through a porous diaphragm into a dilute solution of ammonia, the chloramine may be produced in solution up to a concentration of 340 parts of chloramine per million of water and with a yield which is 94 per cent of the theoretical quantitative yield. Also in working with solutions of chlorine, solutions of a greater strength can be used if such precautions are taken, for example, a solution containing .5 grammes of chlorine to the litre can be employed. If these solutions be allowed to diffuse through a porous diaphragm such as, for example, a Pasteur-Chamberlain filter or through a similar tubular diaphragm, such as a carborundum candle, into a solution of ammonia containing .750 parts of ammonia in one litre of water, the process carred out in this way results in the production of mono-chloramine. If, however, the ammonia solution is allowed to diffuse slowly in the correct proportions into the solution of chlorine, the product is then mainly di-chloramine.

It is found that the process can be carried out when such porous diaphragms are employed with still higher proportions of chloramine up to 750 parts by weight per million of water, but under the same conditions the yield will be lower in this last case. The conditions can be improved if the liquid on the surface of the candles or porous diaphragm at which the reaction takes place be caused to circulate so as to prevent the local accumulation of the material diffusing through. The result of this precaution is that yields approaching the theoretical quantitative yield can be obtained with even still greater concentration of the reacting substances.

The chloramine solutions prepared according to the present invention are preferably employed within a short time after their preparation, but if protected from heat and bright sunlight they may be stored for several hours without substantial decomposition.

The chloramine solutions exert a sterilizing action greatly in excess of that of an equivalently strong solution of elementary chlorine or hypochlorite, and their sterilizing action is not inhibited by the presence of chlorine-absorbing organic matter. For example, the chloramines are still effective even in the presence of a concentration of faecal matter equivalent to one gramme of faeces per 10,000 of water, and they may therefore be employed in the sterilization of sewage-contaminated waters without previous clarification. As is well known, this cannot be done by the use of chlorine alone unless excessive amounts of chlorine are employed.

The chloramine solutions may be added to water to be treated by the usual methods of dosing such as are employed for the addition of other reagents in solution to water.

The solutions of chloramines prepared according to the present invention can be employed not only for the sterilization of water but also for the purposes of an antiseptic and germicide in general hygienic practice.

Having thus described my invention, what I claim as new and desire to secure by Letters Patent is:—

1. A process for the preparation of a sterilizing agent consisting in adding chlorine to a dilute aqueous solution of ammonia.

2. A process for the preparation of a sterilizing agent consisting in adding chlorine to a dilute aqueous solution of ammonia and preventing local rise of temperature due to the heat of the reaction.

3. A process for the preparation of a sterilizing agent consisting in adding to an aqueous solution of ammonia of a concentration not greater than about .0125 gramme per litre, the equivalent amount of chlorine corresponding to the quantitative formation of a chloramine with the total ammonia present.

4. A process for the preparation of a sterilizing agent consisting in diffusing chlorine through a porous diaphragm into a solution of ammonia of a strength up to about 0.75 gramme of ammonia per litre of water and preventing local rise of temperature due to the heat of the reaction.

5. A process for the preparation of a sterilizing agent consisting in diffusing chlorine through a porous diaphragm into a solution of ammonia, circulating the liquid on the side of the porous diaphragm at which contact with the ammonia takes place whereby local rise of temperature due to the heat of the reaction is prevented.

6. A process for the preparation of a sterilizing agent consisting in diffusing chlorine through a tubular porous diaphragm into a solution of ammonia of strength up to .750 grammes of ammonia per litre of water, circulating the liquid on the side of the porous diaphragm at which contact with the ammonia takes place and preventing local rise of temperature due to the heat of the reaction.

In witness whereof, I hereunto subscribe my name this 25th day of September A. D. 1925.

CHARLES H. H. HAROLD, M. D.